United States Patent
Walton et al.

(10) Patent No.: US 6,773,604 B2
(45) Date of Patent: Aug. 10, 2004

(54) METHOD FOR REDUCING HYDROGEN SULFIDE EMISSIONS FROM WASTEWATER

(75) Inventors: John R. Walton, Colfax, CA (US); Scott W. Duggan, Laguna Niguel, CA (US); Michael R. Fagan, Blairstown, NJ (US)

(73) Assignee: U.S. Peroxide LLC, Laguna Niguel, CA (US)

( * ) Notice: Subject to any disclaimer, the term of this patent is extended or adjusted under 35 U.S.C. 154(b) by 169 days.

(21) Appl. No.: 09/932,042

(22) Filed: Aug. 17, 2001

(65) Prior Publication Data

US 2003/0062322 A1 Apr. 3, 2003

(51) Int. Cl.$^7$ .............................. B01D 21/00; C02F 1/72
(52) U.S. Cl. ...................... 210/710; 210/711; 210/722; 210/759; 210/916
(58) Field of Search ................................. 210/601, 630, 210/631, 723, 754, 758, 916, 759, 710, 711, 722

(56) References Cited

U.S. PATENT DOCUMENTS

| | | | |
|---|---|---|---|
| 3,906,039 A | * | 9/1975 | Furkert ........................ 423/540 |
| 4,292,293 A | | 9/1981 | Johnson et al. |
| 4,311,680 A | | 1/1982 | Frech et al. |
| 4,363,215 A | | 12/1982 | Sharp |
| 4,388,194 A | | 6/1983 | Hills |
| 4,435,371 A | | 3/1984 | Frech et al. |
| 4,673,560 A | * | 6/1987 | Masse et al. ................ 423/532 |
| 4,789,530 A | | 12/1988 | Johnson et al. |
| 4,883,601 A | | 11/1989 | Koepke et al. |
| 5,071,622 A | | 12/1991 | Dunson, Jr. |
| 5,104,527 A | * | 4/1992 | Clinkenbeard |
| 5,427,752 A | * | 6/1995 | Suehiro et al. ............. 423/231 |
| 5,635,078 A | | 6/1997 | Yan |
| 5,702,615 A | * | 12/1997 | Numata et al. ............. 210/759 |
| 5,705,135 A | | 1/1998 | Deberry et al. |
| 5,906,750 A | * | 5/1999 | Haase ........................ 210/727 |
| 6,200,456 B1 | * | 3/2001 | Harrar et al. ................ 205/553 |
| 6,245,553 B1 | * | 6/2001 | Keyser ........................ 435/266 |
| 6,428,701 B1 | * | 8/2002 | Mullennix et al. .......... 210/606 |
| 6,495,096 B1 | * | 12/2002 | Hamaguchi et al. ........... 422/5 |

OTHER PUBLICATIONS www.h2o2.com/applications/municipalwastewater/ironsalts2.html (last modified Jun. 16, 2001).*
CRC Handbook of Chemistry and Physics, 59th edn. (1978–1979), Table of Physical Constants of Inorganic Compounds, p. B–127.*
"Properties and Classification of Nitric Acit," http://www.efma.org/Publications/NitricAcid/Section03.asp, downloaded Mar. 3, 2004.*
Pomeroy, R.D. and Bowlus, F.D. (1946) Progress Report on Sulfide Control Research., Sew. Works J., 18, 597
Water Environment Federation and American Society of Civil Engineers, "Odor Control in Wastewater Treatment Plants" (WEF Manual of Practice No. 22), 1995.
Weber, M.D., et al., "Evaluation and optimization of ferric chloride and chlorine feed rates for odor control," *WEF Specialty Conference Series Proceedings*, Odor and Volatile Organic Compound Emission Control for Municipal and Industrial Wastewater Treatment Facilities, Apr. 24–27, 1994, 2–1—2–12.

* cited by examiner

Primary Examiner—Chester T. Barry
(74) Attorney, Agent, or Firm—Woodcock Washburn LLP

(57) ABSTRACT

A cost-effective method for reducing the dissolved sulfide content in a wastewater stream and thereby hydrogen sulfide emissions therefrom involving the steps of adding a transition metal salt to the wastewater stream at the upper reaches of a wastewater collection system prior to at least some hydrogen sulfide volatilization followed by addition of an oxidant to the wastewater stream to generate elemental sulfur and a transition metal salt which subsequently participates in additional hydrogen sulfide capturing steps, thereby also improving water quality and wastewater treatment plant operations.

14 Claims, No Drawings

METHOD FOR REDUCING HYDROGEN SULFIDE EMISSIONS FROM WASTEWATER

BACKGROUND OF THE INVENTION

The present invention relates to a method for reducing the dissolved sulfide content within a wastewater stream and thereby the hydrogen sulfide emissions there from and for improving water quality and treatment plant operations by employing a transition metal salt and an oxidant as additives to the wastewater stream.

Hydrogen sulfide ($H_2S$) is a toxic, corrosive gas that is generated within the biomass adhered to pipe walls and sediment of a sewage system. As wastewater is conveyed through the sewage collection system to the wastewater treatment plant, septic conditions develop that foster the growth of hydrogen sulfide-producing bacteria. Hydrogen sulfide volatilizes from the wastewater into the vapor space of the sewage system where it creates the problems of nuisance odors, infrastructure corrosion, and worker hazards.

The use of iron salts alone to control hydrogen sulfide emissions in wastewater is known in the industry. Iron salts control hydrogen sulfide ($H_2S$) by converting volatile $H_2S$ dissolved in the wastewater into nonvolatile iron-complexed sulfide (FeS):

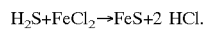

$$H_2S + FeCl_2 \rightarrow FeS + 2\, HCl.$$

Ferrous sulfide (FeS) is a black precipitate that is stable in the absence of acid and typically settles out in clarifiers at the wastewater treatment plant, where it enters the solids stream. The stoichiometric chemical requirement is 1.7 pounds Fe (or 3.7 pounds $FeCl_2$) per pound $H_2S$ controlled, yielding a cost of approximately $0.50 per pound hydrogen sulfide depending on the per-unit chemical cost. Additionally the efficiency of iron salts is not impacted by oxygen uptake rates within the wastewater.

Despite these advantages, the use of iron salts alone to control $H_2S$ emissions in wastewater has shortcomings. Iron salts alone lose efficiency when achieving $H_2S$ emissions control for more than about four hours hydraulic retention time. Hydraulic retention time is defined as the length of time a component resides within the sewage system. Thus the efficient use of iron salts alone to control $H_2S$ emissions of wastewater requires a series of iron salt injection facilities located along the course of the wastewater collection system. At each injection site, the spent iron salt (FeS) is augmented with fresh iron salt. As used herein, the term "iron salt" refers to nearly any iron compound (as distinguished from elemental iron) and expressly includes iron hydroxide ($Fe(OH)_2$, $Fe(OH)_3$, $FeCl_3$, $FeCl_2$, $FeSO_4$, and $Fe_2(SO_4)_3$) but excepts FeS, which is often referred to herein as "spent iron salt." The spent iron salt largely remains inert throughout the treatment and disposal processes. When the wastewater reaches the treatment plant, the mass of spent iron salt settles out in the primary clarifiers. The iron salt demand increases 2–4 fold to achieve $H_2S$ emissions control for greater than about four hours hydraulic retention time, thus increasing the amount of spent iron salt generated. The FeS precipitates and constitutes a theoretical solids load of about 3 pounds per pound $H_2S$ controlled. The FeS precipitate can cause deposition problems within the sewage system, particularly in low-velocity sewage systems and clarifiers/thickeners as it settles out, thus increasing the actual cost per pound $H_2S$ controlled by 20% ($0.075) or more.

Iron salts also degrade the quality of wastewater. The salinity of wastewater is increased by the addition of iron salts, as a minimum of 3 pounds sodium chloride per pound $H_2S$ controlled is generated when $FeCl_2$ or $FeCl_3$ is used as the iron salt. Iron salts also deplete the alkalinity of the wastewater stream by consuming a minimum of 3 pounds calcium carbonate per pound $H_2S$ controlled. Further, iron salt products typically contain 1–4% mineral acid that further depresses the pH of the wastewater. The reduced alkalinity of the wastewater stream in turn reduces the capturing capacity of iron, thus reducing its ability to control $H_2S$ to low levels. Furthermore, the depressed pH of the wastewater encourages volatilization of untreated $H_2S$ within the wastewater stream. Additionally, iron salts deplete the wastewater stream of dissolved oxygen by consuming a minimum of 5 pounds dissolved oxygen per pound $H_2S$ controlled. Thus, while iron salts are useful in controlling $H_2S$ emissions of wastewater, it is desirable to minimize the amount of iron salt added to the wastewater stream to minimize the disadvantages associated with the use of iron salts.

It has been reported that a blend of 1 part ferrous to 2 parts ferric iron provides improved control of $H_2S$ emissions from a wastewater stream when compared to either ferrous or ferric iron alone. Such a blend, however, is expensive and is subject to the same disadvantages of iron salts previously stated.

The use of hydrogen peroxide ($H_2O_2$) alone to control $H_2S$ emissions is also conventional. Like iron salts, $H_2O_2$ injection facilities within the sewage system are typically located in series, separated by 1–2 hours hydraulic retention time. The use of hydrogen peroxide alone controls $H_2S$ emissions in wastewater by two mechanisms: direct oxidation of $H_2S$ to elemental sulfur (I) or prevention of $H_2S$ formation by supplying dissolved oxygen (II):

$$H_2S + H_2O_2 \rightarrow S_o + 2H_2O \tag{I}$$

$$2H_2O_2 \rightarrow O_2 + 2H_2O \tag{II}.$$

Direct oxidation theoretically requires 1.0 pound $H_2O_2$ per pound $H_2S$ controlled at a cost of about $0.50 per pound $H_2S$ and generates 1.0 pound solids per pound $H_2S$ controlled, regardless of $H_2O_2$ dose. In contrast, prevention of $H_2S$ formation by providing a dissolved oxygen supply theoretically requires 4.0 pounds $H_2O_2$ per pound $H_2S$ controlled at a cost of $2.00 per pound sulfide. The second mechanism also is adversely affected by environmental factors such as hydraulic retention time and oxygen uptake. Thus, the practical $H_2O_2$ requirement can be 2–4 times the theoretical $H_2O_2$ requirement when retention time increases by 2–3 hours. Therefore, previous $H_2O_2$ applications within the municipal wastewater treatment industry are either targeted at point source $H_2S$ control, such as at the headworks to treatment plants, where $H_2O_2$ may be applied to the wastewater stream to maximize its most efficient mode as an oxidant, or added as a preventative within the wastewater collection system, at costs exceeding $2.00 per pound $H_2S$ controlled.

While the independent use of $H_2O_2$ to control $H_2S$ emissions by wastewater generates no adverse by-products and advantageously oxygenates the wastewater, it presents several shortcomings. Specifically, the oxidation reaction typically requires 15–30 minutes. In addition, control of $H_2S$ emissions at 1–2 hours hydraulic retention time or more is expensive, requiring double the injection stations required by $FeCl_2$ control. Furthermore, the efficiency of $H_2O_2$ is adversely affected by high oxygen uptake rates. Hence, a mechanism which provides greater and more efficient H₂S emissions control within the wastewater treatment system is desirable.

A process for the conversion of aqueous hydrogen sulfide in geothermal steam employing hydrogen peroxide and iron compounds is taught by U.S. Pat. No. 4,363,215 to Sharp. In the disclosed process, hydrogen sulfide is reacted with hydrogen peroxide, wherein the iron compound serves as a catalyst to accelerate the reaction of hydrogen peroxide with hydrogen sulfide. The iron compound catalyst is added in an amount of from 0.5 to 1.0 parts per million expressed as free metal and thus does not complex with the sulfide. U.S. Pat. No. 4,292,293 to Johnson et al. further discloses the addition of polyanionic dispersants to improve the efficiency of the metallic ion catalyst for the oxidation of sulfide by hydrogen peroxide.

The addition of a combination of a ferric salt and an anionic polymer to a water clarifier is a known development in enhancing solids separation and thereby improving the cost-performance of wastewater treatment plants, though such treatment has not yet been widely employed within the industry.

It is the object of the present invention to provide a cost-effective means for reducing hydrogen sulfide emissions throughout the wastewater collection system as well as the wastewater treatment plant while improving water quality and treatment plant operations.

BRIEF SUMMARY OF THE INVENTION

The present invention provides a novel method for integrating the use of transition metal salts and oxidants, specifically iron salts and hydrogen peroxide, respectively, to achieve reduced dissolved sulfide levels and thereby $H_2S$ levels within a sewage system. Iron salts are added to the wastewater stream at the upper reaches of the wastewater collection system prior to $H_2S$ volatilization to capture $H_2S$ dissolved in the wastewater. The captured sulfide, as ferrous sulfide, is then delivered to one or more points downstream of the iron salt addition where hydrogen peroxide is added to the wastewater stream. The hydrogen peroxide destroys the ferrous sulfide and restores the sulfide-capturing capacity of the iron. At the final regeneration point, for example the wastewater treatment plant, the restored iron salt is used to enhance solids separation and sulfide control in primary clarifiers as well as sulfide and struvite control in anaerobic digesters.

DETAILED DESCRIPTION OF THE INVENTION

Applicants have discovered a novel process for controlling hydrogen sulfide emissions from wastewater and for improving water quality and wastewater treatment plant operations in a cost-effective manner. The method of the present invention involves the use of transition metal salts to capture sulfides generated within a sewage system and to deliver the captured sulfides to an oxidant added at a point downstream of the transition metal salt addition. The oxidant restores the capturing capacity of the transition metal by regenerating a transition metal salt from the spent transition metal salt (transition metal sulfide), thus allowing the regenerated transition metal salt to participate in the capture of additional hydrogen sulfide molecules. The transition metal salt is preferably a ferrous or ferric salt in a solution or any readily water-soluble form. For example, the iron salt may be ferrous or ferric sulfate, chloride, nitrate, bromide, bromate, or a mixture thereof. The oxidant is preferably hydrogen peroxide.

The transition metal salt, preferably iron salt, is added to a wastewater stream at the upper reaches of a wastewater collection system prior to hydrogen sulfide volatilization. While hydrogen sulfide will begin volatilizing almost immediately, the term "prior to hydrogen sulfide volatilization" is intended to mean prior to some volatilization, not necessarily prior to all volatilization. The iron salt will aid in preventing future $H_2S$ volatilization regardless of whether $H_2S$ has volatilized previously. It would be practically impossible to introduce iron salt prior to all $H_2S$ volatilization. The greater the amount of hydrogen sulfide already present in the wastewater stream at the point of iron salt addition, the greater the benefit of adding ferric salt to control hydrogen sulfide emissions, instead of ferrous salt, as ferric salt has an oxidizing capacity, albeit small. An oxidant, preferably hydrogen peroxide, is then added to the wastewater stream at one or more points downstream of the iron salt addition, to regenerate iron salt in situ. The hydrogen peroxide oxidizes the iron sulfide formed, to produce ferric hydroxide and/or ferrous hydroxide salts.

Multiple regeneration steps using a series of hydrogen peroxide additions spaced at points separated by approximately 4 hours hydraulic retention time may be used where the water collection system is long. In addition, hydrogen peroxide is preferably added to the influent wastewater stream at the wastewater treatment plant, the final regeneration point. The iron hydroxide produced enhances solids separation and sulfide control in primary clarifiers, as well as sulfide and struvite control in anaerobic digesters at the treatment plant. An anionic polyelectrolyte may be added to the influent of a primary clarifier at the wastewater treatment plant to further improve solids separation.

The present invention may be represented as the following catalytic cycle, where a working inventory of iron is maintained with hydrogen sulfide ($H_2S$) as the input, elemental sulfur ($S_o$) as the output, and hydrogen peroxide ($H_2O_2$) as the driver:

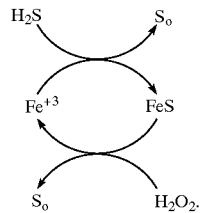

The preferred embodiment of the process occurs in three steps: (1) iron complexation with dissolved sulfide; (2) direct $H_2O_2$ oxidation of the FeS complex to provide elemental sulfur and ferric hydroxide ($Fe(OH)_3$); and (3) oxidation of additional sulfide by the ferric hydroxide to produce elemental sulfur and FeS. The second and third steps are then repeated as additional hydrogen peroxide is used to regenerate ferric hydroxide from the ferrous sulfide. The preferred process may be exemplified in the following overall reaction:

| Step 1: | 2 H₂S + 2 FeCl₂ → 2 FeS + 4 HCl |
| Step 2: | 2 FeS + 3 H₂O₂ → 2 S₀ + 2 Fe(OH)₃ |
| Step 3: | 2 Fe(OH)₃ + 3H₂S → S₀ + 2 FeS + 6 H₂O |

Net reaction: 5 H₂S + 2 FeCl₂ + 3H₂O₂ → 3 S₀ + 2 FeS + 6 H₂O + 4 HCl.

This net reaction stoichiometrically requires 0.67 lbs Fe (or 1.45 lbs FeCl₂) and 0.6 lbs H₂O₂ per lb sulfide, to yield a theoretical cost of about $0.50 per lb sulfide controlled. This is based on 0.67 lbs $Fe^{2+}$. Commensurately less iron would be required if introduced as $Fe^{3+}$. In that case, only 0.5 lbs $Fe^{3+}$ and 0.6 lbs $H_2O_2$ per lb sulfide controlled would be needed.

The method of the present invention achieves a number of advantages over conventional methods. In sharp contrast to conventional treatment techniques the addition of fresh iron salt downstream of the initial injection site or even at the treatment plant is not required, as a mixture of ferric and ferrous salts is provided by in situ regeneration of spent iron salt by hydrogen peroxide in the wastewater collection system and upon entry of the treatment plant. Because iron salt need only be added to the wastewater stream at one point in the collection process and is regenerated thereafter by hydrogen peroxide, the present invention requires only a fraction of the iron input required by the related art. Thus, the present invention achieves a greater than 40% reduction in solids production, a greater than 60% reduction in acidity contribution, and a greater than 80% reduction in dissolved oxygen demand. These benefits result in an overall cost savings by reducing the solids load and the amount of iron salt required, thus reducing the solids generated and associated disposal cost.

Additionally, the iron levels in the wastewater stream augmented by reaction of FeS with $H_2O_2$ increases the removal rate of $H_2S$ by more than 90%, thus significantly improving the degree of $H_2S$ control afforded as compared to the use of iron salt or $H_2O_2$ alone. For example, the use of $H_2O_2$ alone to control sulfide emissions requires $H_2O_2$ addition at a site 20–40 minutes hydraulic retention time upstream of the point of $H_2S$ release. In sharp contrast, the present invention allows the addition of $H_2O_2$ to be located at or 1–10 minutes prior to the point of desired $H_2S$ control.

Regeneration of iron salt with $H_2O_2$ also results in a mixture of ferric and ferrous salts having superior $H_2S$ capturing capacity as compared to ferric or ferrous salt alone. The ferrous-to-ferric iron ratio of this blended product may be adjusted by varying the $H_2O_2$ dose.

The present invention represents a novel and significant improvement for reducing $H_2S$ emissions from wastewater. In addition to providing practical, long-duration $H_2S$ control to low sulfide levels via a rapid oxidative reaction, the method of the present invention provides significant treatment plant benefits. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for reducing the evolution of hydrogen sulfide vapors within a sanitary sewer system, comprising the steps of:
    (a) adding an iron salt to a wastewater stream within said sanitary sewer system upstream of hydrogen sulfide volatilization to produce free iron ions which react with said hydrogen sulfide to form iron (II) sulfide; and
    (b) adding deliberately an oxidant to said wastewater stream downstream of said iron salt addition to regenerate free iron ions from said iron (II) sulfide wherein, in said method, no nitrate ion is added to said wastewater stream.

2. The method of claim 1 wherein said oxidant is hydrogen peroxide.

3. The method of claim 1 wherein said iron salt is selected from the group consisting of ferrous chloride, ferrous sulfate, ferric chloride, ferric sulfate, and mixtures thereof.

4. The method of claim 1 wherein said regenerated free iron ions are ferric ions.

5. The method according to claim 1, further comprising the step of:
    (c) adding deliberately an oxidant to said wastewater stream downstream of said oxidant addition step (b), wherein the oxidant of step (c) may be the same oxidant as the oxidant of step (b) or may be a different oxidant than the oxidant of step (b).

6. The method of claim 5, wherein said oxidant addition of step (c) occurs at or upstream of a wastewater treatment plant.

7. The method of claim 1, wherein said oxidant is added to said wastewater stream in a stoichiometric amount of oxidant per pound sulfide controlled.

8. The method of claim 2, wherein said hydrogen peroxide is added to said wastewater stream in a stoichiometric amount of oxidant per pound sulfide controlled.

9. The method of claim 2 wherein said hydrogen peroxide is added to said wastewater stream in an amount of at least 1.0 lbs $H_2O_2$ per pound sulfide controlled.

10. A method for reducing the evolution of hydrogen sulfide vapors within a sanitary sewer system, comprising the steps of:
    (a) adding an iron salt to a wastewater stream within said sanitary sewer system upstream of hydrogen sulfide volatilization to produce free iron ions which react with said hydrogen sulfide to form iron (II) sulfide;
    (b) adding deliberately an oxidant to said wastewater stream downstream of said iron salt addition to regenerate free iron ions from said iron (II) sulfide; and
    (c) adding an anionic polyelectrolyte to said wastewater stream at said wastewater treatment plant.

11. A method of enhancing solids separation in a primary clarifier comprising:
    (a) adding an iron salt to a wastewater stream in a wastewater collection system upstream of hydrogen sulfide volatilization to produce free iron ions which react with said hydrogen sulfide to form iron (II) sulfide;
    (b) adding deliberately an oxidant to said wastewater stream downstream of said iron salt addition to regenerate free iron ions from said iron (II) sulfide, which free iron ions react with said hydrogen sulfide to reform iron (II) sulfide; and
    (c) adding deliberately an oxidant to said wastewater stream at the inlet of a wastewater treatment plant prior to entry of said wastewater to said primary clarifier.

12. The method of claim 11 wherein said oxidant is hydrogen peroxide.

13. A method of treating wastewater at a wastewater treatment plant comprising:
    (a) adding an iron salt to a wastewater stream in a wastewater collection system upstream of hydrogen sulfide volatilization to produce free iron ions which react with said hydrogen sulfide to form iron (II) sulfide;
    (b) adding deliberately an oxidant to said wastewater stream downstream of said iron salt addition to regenerate free iron ions from said iron (II) sulfide, which free iron ions react with said hydrogen sulfide to reform iron (II) sulfide; and
    (c) adding deliberately an oxidant to said wastewater stream at the inlet of a wastewater treatment plant to regenerate free iron ions from said reformed iron (II) sulfide.

14. The method of claim 13 wherein said oxidant is hydrogen peroxide.

* * * * *